(12) United States Patent
Matthews

(10) Patent No.: US 7,453,957 B1
(45) Date of Patent: Nov. 18, 2008

(54) METHOD AND APPARATUS FOR TRANSMITTING HIGH SPEED DATA BY SPECTRAL DECOMPOSITION OF THE SIGNALING SPACE

(75) Inventor: Adrian S Matthews, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 385 days.

(21) Appl. No.: 11/218,096

(22) Filed: Aug. 31, 2005

Related U.S. Application Data

(63) Continuation of application No. 09/931,782, filed on Aug. 17, 2001, now Pat. No. 7,012,953, which is a continuation-in-part of application No. 09/021,137, filed on Feb. 10, 1998, now Pat. No. 6,400,776.

(51) Int. Cl.
*H04K 1/10* (2006.01)
*H04L 23/02* (2006.01)
*H04L 27/36* (2006.01)
*H04L 27/34* (2006.01)

(52) U.S. Cl. ..................... 375/324; 375/260; 375/261

(58) Field of Classification Search ................. 375/222, 375/260, 261, 279, 280, 281, 329, 332, 316, 375/324

See application file for complete search history.

(56) References Cited

U.S. PATENT DOCUMENTS

| | | | |
|---|---|---|---|
| 4,679,227 A | 7/1987 | Hughes-Hartogs | |
| 4,731,816 A | 3/1988 | Hughes-Hartogs | |
| 4,833,706 A | 5/1989 | Hughes-Hartogs | |
| 5,295,159 A | 3/1994 | Kerpez | |
| 5,640,423 A | 6/1997 | Archer | |
| 5,838,727 A | 11/1998 | Lyon et al. | |
| 5,995,565 A | 11/1999 | Tong et al. | |
| 6,134,274 A | 10/2000 | Sankaranarayanan et al. | |
| 6,400,776 B1 * | 6/2002 | Matthews | 375/298 |
| 6,563,841 B1 | 5/2003 | Nedic et al. | |
| 7,012,953 B2 * | 3/2006 | Matthews | 375/222 |

OTHER PUBLICATIONS

Gruenbacher and Hummels, "N Dimensional Orthogonal QPSK signaling with Discrete Prolate Spheroidal Sequences", Aug. 9-12, 1998, Radio and Wireless Conference, 1998. RAWCON 98. 1998 IEEE.*

Vahlin, A.; Holte, N., "Optimal finite duration pulses for OFDM"; Global Telecommunications Conference, 1994. GLOBECOM '9 'Communications: The Global Bridge'., IEEE , Nov. 28-Dec. 2, 1994 pp. 258-262.

Pfletschinger, S.; Speidel, J.; "Optimized impulses for multicarrier offset-QAM" Global Telecommunications Conference, 2001 GLOBECOM '01. IEEE, vol. 1 , Nov. 25-29, 2001, pp. 207-211.

(Continued)

*Primary Examiner*—Betsy L Deppe

(57) ABSTRACT

A method and apparatus of high speed multi-dimensional signaling via a modem has a processing method of utilizing prolate pulses to optimize the transmission capacity of the channel. The modem includes a process that segments the channel bandwidth and allocates the power and bit loading in relation to a measure of the noise in each spectral bin. Data are carried over a plurality of frequencies across the channel, and within each spectral bin, a plurality of orthogonal signaling dimensions.

6 Claims, 4 Drawing Sheets

OTHER PUBLICATIONS

Vahlin, A.; Holte, N.; "Optimal finite duration pulses for OFDM Communications", IEEE Transactions on , vol. 44 , Issue: 1 , Jan. 1996 pp. 10-14.

Irving Kalet, "The Multitone Channel", IEEE Transactions on Communications, vol. 37, No. 2, Feb. 1989, pp. 119-124.

"Practical Generation of Spectrally Efficient Pulses", ICCC '85, Jun. 1985, pp. 18.2.1-18.2.5.

B. Hirosaki, et al. "A 19.2 Kbps Voiceband Data Modem Based on Orthogonal Multiplexed QAM Techniques", ICC '85, Jun. 1985, pp. 21.1.1-21.1.5.

J.A.C.Bingham, "Multicarrier Modulation for Data Transmission: An Idea Whose Time Has Come", IEEE Comm. May 1990, pp. 5-14.

A. Cantoni and P. Butler, "Properties of the Eigenvectors of Persymmetric Matrices with Applicaitons to Communication Theory", IEEE Trans. on Comm., vol. COM-24 No. 8, Aug. 1976, pp. 804-809.

* cited by examiner

METHOD AND APPARATUS FOR TRANSMITTING HIGH SPEED DATA BY SPECTRAL DECOMPOSITION OF THE SIGNALING SPACE

CROSS REFERENCE TO RELATED APPLICATION

This application is a continuation of U.S. patent application Ser. No. 09/931,782 filed Aug. 17, 2001 (now issued as U.S. Pat. No. 7,012,953), entitled, "METHOD AND APPARATUS FOR TRANSMITTING HIGH SPEED DATA BY SPECTRAL DECOMPOSITION OF THE SIGNALING SPACE", which is a continuation in part of U.S. patent application Ser. No. 09/021,137 filed Feb. 10, 1998 (issued Jun. 4, 2002 as U.S. Pat. No. 6,400,776), entitled, "METHOD AND APPARATUS FOR HIGH SPEED DATA TRANSMISSION BY SPECTRAL DECOMPOSITION OF THE SIGNALING SPACE". Each of the aforementioned applications is incorporated herein by reference.

FIELD OF THE INVENTION

This invention is generally directed to high-speed data communication, and more specifically, to the area of high-speed modem design. It relates to achieving high spectral efficiency in signaling systems.

BACKGROUND OF THE INVENTION

Modern telecommunication applications have resulted in substantial increases in the need for additional bandwidth. For example, in the area of wired communications, there is a need to simultaneously support voice, video, and data applications at low BER (Bit Error Rates) using new high-speed modem designs for twisted pairs. At signaling rates better than 10 Mbits/s performance bounds generally exceed a BER of $10^{-6}$. When the conventional Pulse Amplitude Modulation (PAM) technique is used, the baseband communication signal is represented by a series of modulated pulses whose amplitude levels are determined by the symbol to be transmitted. For example, with 16-QAM (Quadrature Amplitude Modulation), typical symbol amplitudes of ±1 and ±3 are utilized in each quadrature channel. For digital communication systems, efficient used of bandwidth is crucial when dealing with time-dispersive channel, as is common with wireless systems. In these types of systems, whenever there is distortion of the signals due to preceding or following pulses, normally referred to as pre-cursors and post-cursors, respectively, the amplitude of the desired pulse is affected due to superimposition of the overlapping pulses. This phenomenon is known as intersymbol interference, and is an impediment to high-speed data transmission, especially in systems that are constrained by limited bandwidth.

One way to minimize the effects of intersymbol interference is to use an equalizer. Fixed equalizers are designed to be effectively operated between an upper and lower bound between which the channel is expected to deviate. Whenever these limits are exceeded, the equalizer ceases to operate effectively. Hence, there has to be a certain degree of precision when channel equalization is employed, and fixed equalizers are implemented. There are adaptive equalizers (i.e., continuous) that track dynamic channel dispersion and make continuous adjustments to compensate for such intersymbol interference. This provides some improvement in performance over the fixed equalizer.

Incorporation of the equalizer into some communication systems does not come without penalty. In wireless systems, for instance, insertion loss becomes a critical factor if the equalizer is present and the associated impairment does not occur. The main purpose of the equalizer implementation is to enhance the information bearing capability of the communication system with the design objective of asymptotically approaching the capacity bounds of the transmission channel. Consequently, the use of the equalizer can be regarded as one instance of an array of possibilities that may be implemented to enhance the bit rate of the communication system design.

SUMMARY OF THE INVENTION

In accord with the invention, a method and apparatus is provided that makes more efficient use of the available signaling bandwidth in the sense of asymptotically approaching possible transmission limits. This is done by significantly reducing the effects of intersymbol and interchannel interference by a judicious choice of the signaling pulse shapes. In particular, prolate pulses are used to extend channel capacity and reduce interference. By use of orthogonal axes that span the signal space, combined with water filling techniques for efficient allocation of transmission energy based on the noise distribution, the information content can be increased without increase in bandwidth.

The signaling space is spectrally decomposed to support the simultaneous transmission of multiple signals each with differing information bearing content. These signals being orthogonal, are non-interfering. Signals are constructed as complex sets and are generally represented with axial coordinates, all orthogonal to one another within the complex plane. The real axis is termed the in-phase (I) component and the imaginary axis is termed the quadrature (Q) component. Each component defines a spanning vector in the signal space.

DETAILED DESCRIPTION

Figure 4:
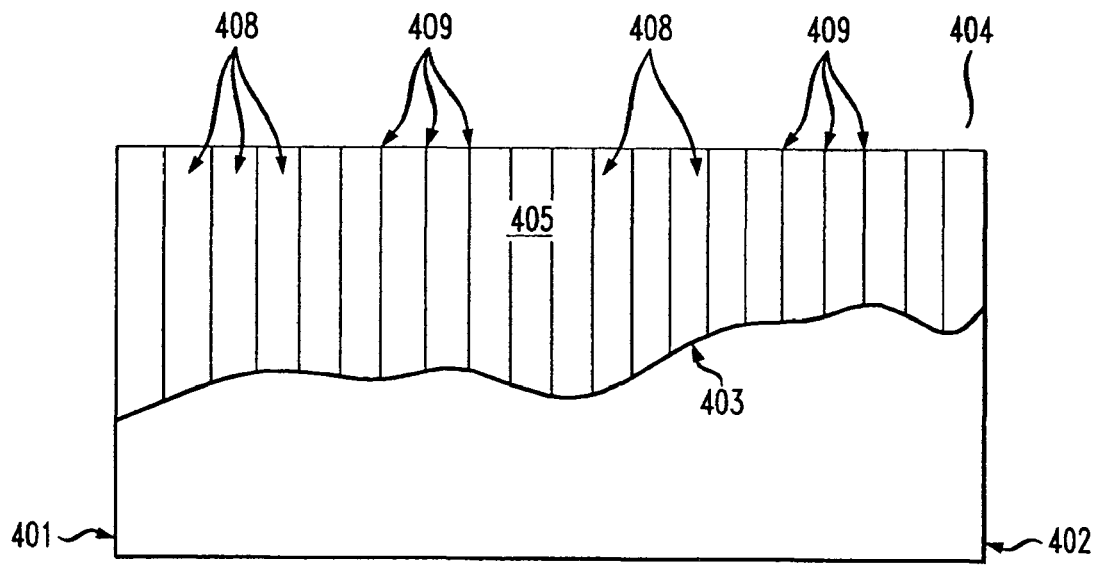
FIG. 4 is a graph illustrating the application of water filling to the present invention.

Spectral efficiency in digital systems is largely a function of the wave shapes of the signals that are used to carry the digital information. There are tradeoffs between time limitations and frequency limitations. These two requirements generally have a flexible relationship. The characteristics of prolate pulses may be chosen to limit spectral energy dispersion thereby permitting more signaling channels for a given bandwidth. These advantages become readily apparent with an analysis of the prolate pulse spectral performance. In particular, the Fourier transform of the waveform is very band limited. Proper selection of signal space such as axes or spectral vectors representing signal coordinates are very important. If signals are orthogonal to one another, transmission techniques utilizing methods of water filling may be implemented with significant increase in efficiency. The technique of water filling is discussed in "Multicarrier Modulation for Data Transmission: An Idea Whose Time Has Come", J. A. C. Bingham, "*IEEE Communications*," May 1990, pp. 5-14 incorporated by reference. An illustrated of water filling may be ascertained from the graph of FIG. 4. A bandwidth of a channel is defined by the marks 401 and 402 on the horizontal axis. The curve 403 defines the noise level produced as seen by a receiver. The energy level, which the channel can transmit, is defined by the horizontal level 404. The area 405 bounded by the curve 403 and energy level 404 may be "water filled" by data signals. The data acceptance area 405 of the band is divided into sections 408 by vertical dividers 409. The signal data is inserted into a section until the added data and noise in that section reaches the energy level limit. This filling combined with the orthogonal nature of the data signals inserted in the sections permit the increase in the data capacity of the channel.

Consider a trigonometric polynomial $p_i(t)$ defined as follows:

$$p_i(t) = \sum_{n=-N}^{N} a_{in} e^{jn\pi t} \tag{1}$$

Figure 1:
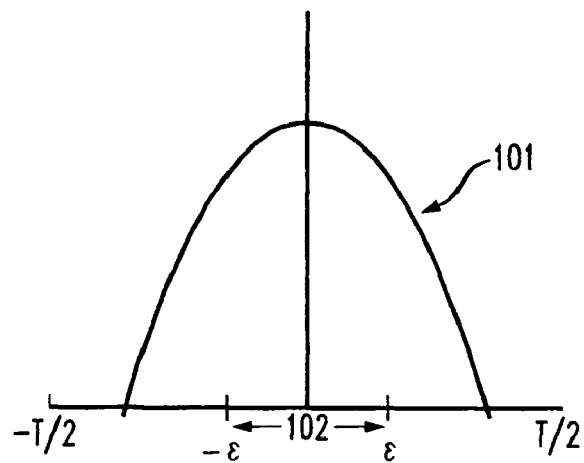
FIG. 1 is a graph depicting the concentration of energy in a prolate pulse interval.

In equation (1) the period may be chosen to be 2 by suitable scaling of t. The coefficients $a_{in}$ can be obtained by an optimization process, the objective of which is to obtain a spectrally efficient pulse. The process may be regarded as a scheme in which the energy of the pulse is concentrated in the interval $[-\epsilon, \epsilon]$. This is shown in FIG. 1 where a more or less generic pulse 101 is shown and the constraining interval 102 is indicated. The optimization process is a transmission pulse design problem, and a particular mathematical approach for achieving this objective is now described. In general, optimal communication system design requirements often necessitate the transmission of spectrally efficient pulses in order to minimize both intersymbol interference and interchannel interference where application requires segmented spectrum utilization.

Based on the specified format in equation (1), it can be shown that the coefficients $a_{in}$ of $p_i(t)$ satisfy the following system of equations:

$$\sum_{m=-N}^{N} \frac{\sin(n-m)\pi\varepsilon}{(n-m)\varepsilon} a_{im} = \lambda a_{in}, n = -N, -N+1, \ldots N. \tag{2}$$

Equation (2) may be rewritten in the form, $$S\bar{a}_i = \lambda_i \bar{a}_i \tag{3}$$

Where the coefficients $S_{nm}$ of the matrix S defined by equation (3), and eigenvectors $\bar{a}_i$ are given by, $$S_{nm} = \frac{\sin(n-m)\pi\varepsilon}{(n-m)\varepsilon} \tag{4}$$

and $$\bar{a}_i = [a_{-Ni}, a_{(-N+1)i}, \ldots a_{0i}, \ldots, a_{(N-1)i}, a_{Ni}]^t \tag{5}$$

Where t denotes transpose. The matrix S is a real, symmetric, and positive definite with other mathematical properties of interest to the development, as now discussed. There are thus 2N+1 real eigenvalues $\lambda_i$ which satisfy (3) and which may be ordered such that:

$$\lambda_1 > \lambda_2 > \ldots > \lambda_{2N+1} \tag{6}$$

For each eigenvalue $\lambda_i$, there is an associated eigenvector $\bar{a}_i$, whose coefficients can be used to form the trigonometric function defined in equation (1). The eigenvectors of the matrix S may be normalized to have unit energy. Because of the orthogonality of the eigenvectors of symmetric matrices, their dot products $\bar{a}_i \cdot \bar{a}_j$ satisfy the following relationship, $$\bar{a}_i \cdot \bar{a}_j = \sum_{n=-N}^{N} a_{in} a_{jn} = \delta_{ij}, \tag{7}$$

Where $\delta_{ij}$ is the Kronecker delta function. Because of equation (3) and equation (7), it can be shown that functions of the form of equation (1) whose coefficients are those of the eigenvectors of the matrix S as defined in equation (4), the following relationships holds:

$$\frac{1}{2} \int_{-1}^{1} p_i(t) p_j(t) dt = \delta_{ij}, \tag{8}$$

and, $$\frac{1}{2} \int_{-\varepsilon}^{\varepsilon} p_i(t) p_j(t) dt = \lambda_i \delta_{ij} \tag{9}$$

Functions so formed are described as discrete prolate.

With the background material discussed above, a particular method of communicating digital information using the functions $p_i(t)$ defined earlier is now presented. Again, in view of equation (6), there are 2N+1 eigenvectors that satisfy equation (3). The vectors together form a spanning set for the vector space defined by the matrix S. Define D to be the dimension of the associated vector space. Then D is given by:

$$D = 2N+1 \tag{10}$$

Note that D is a design parameter, and is a function of N. By analogy, $\{p_i(t)\}$ form a spanning set for the signal space associated with the matrix S, and this signal space is also D dimensional. Consider the construct:

$$x_i(t) = \sum_{k=-\infty}^{\infty} I_k p_i(t-kT) \tag{11}$$

Generalizing and using equation (8), it can be shown that the following holds:

$$\frac{1}{2T} \int_{-T+kT}^{T+kT} x_i(t) p_j(t) dt = \delta_{ij} I_k \tag{12}$$

Equation (12) is of critical importance to the invention. The implications are that if a function of the form of equation (11), for a specific value of i, is transmitted over a communication channel, then the transmitted alphabet $I_k$ will only be uniquely determined in an interval defined by k if the corresponding $p_i(t)$ is used as the receiving filter. If a function of the form of equation (11), for a specific value of i, is transmitted over a communication channel, and $p_j(t)$ for $j \neq i$, is used as the receiving filter, then the function $p_i(t)$ will be virtually non-existent. Thus in order to extract the information content of a signal whose format is given by equation (11), the signaling pulse must be matched at the receiver. In anticipation of making reference to Cartesian space, the format of equation (11) is used in the construction of $y_i(t)$ defined as follows:

$$y_i(t) = \sum_{k=-\infty}^{\infty} Q_k p_i(t - kT) \qquad (13)$$

where again $Q_k$ is the alphabet to be transmitted. It is clear that equation (13) also satisfies a relationship similar to equation (12). Equations (11) and (13) can now be used to quadrature modulate a carrier in the final part of the transmission signal synthesis. Define $s_i(t)$ by:

$$s_i(t) = x_i(t)\cos(2\pi f_c t) - y_i(t)\sin(2\pi f_c t) \qquad (14)$$

Thus, the signals are constructed as complex sets and are generally represented as vectors within the complex plane. The real axis is termed the in-phase (I) component and the imaginary axis is termed the quadrature (Q) component.

As indicated by equation (10), there are D such constructs possible. Because of the orthogonality of the building blocks $\{p_i(t)\}$ discussed earlier, $\{s_i(t)\}$, being linear combinations of a single $p_i(t)$ for each i, are themselves orthogonal, forming a spanning set for the signal space defined over the channel band limited by W=1/2T. That is to say, each such signal $s_i(t)$ may be regarded as an orthogonal "finger" over which the symbols $\{I_k, Q_k\}$ may be independently transmitted. Thus, equation (14) can be used to increase the bit rate of the communication channel without bandwidth expansion. Of course coding and equalization may be added to improve fidelity.

The parameters $\epsilon$ and N determine the spectral shape of the transmission pulses $p_i(t)$. In general $\epsilon$ will be used to determine the compactness of the fit within the signaling period, while N determines the peaking and roll-off. It is important for N to be fairly large (N≧10) as there are at least two benefits to be gained in this regard. Firstly, large values of N contribute to better roll-off characteristics, which directly minimize intersymbol interference. Secondly, as can be seen by equation (10), large values of N contribute directly to an increase in the dimension of the signaling space, providing more discrete prolate functions that can be used to increase the capacity of the transmission system design. However, these benefits must be balanced by the fact that tighter peaks that are made possible by larger values of N are likely to place greater implementation constraints on the receiver, to the extent that more accurate symbol timing shall be required to retrieve the encoded digital information.

In general, the range of values that can be taken on by the discrete symbols $\{I_k, Q_k\}$ determines the number of levels M that may be reasonably distinguished at the receiver, with noise, crosstalk, and interference playing a critical role in the process. Conventional modulation techniques, such as QAM for instance, may be referenced, and the value of M shall be determined in an optimization process in which the power is held constant, and the bit rate is maximized for a given BER constraint. Given M, the information bearing capacity C of the transmitter is computed in a straightforward manner. Thus, $$C = \frac{\log_2 M}{T} \qquad (15)$$

Where C is given in units of bits/s. Equation (15) holds for the one-dimensional case. That is, only when one signal of duration T having M reasonably distinguishable levels is transmitted in a channel bandlimited by W. However, when multiple orthogonal signaling is used for data transmission, the parameter M in equation (15) will be a function of the number of signals chosen, along with the associated levels that may be represented by each independent choice. A limiting reformulation of equation (15) is now given by:

$$C_{\lim} = \frac{\log_2 \prod_i M_i}{T} \qquad (16)$$

Equation (16) hints of the possibility of channel optimization with more efficient encoding of the signaling data. A concrete use of equation (16) is demonstrated in the sequel, specifically, with the aid of FIGS. 3 and 6.

The area of optimal communication system design is generally one in which various signal-processing techniques are comprised to asymptotically approach theoretically established channel capacity limits. Transmission rates may further be optimized if a process known as water filling is implemented. With the implementation of water filling, the available signaling power is allocated to the communication channel, and the bits are loaded in a manner related to the noise spectral density, with the objective of maximizing resource utility. It may be regarded as a process in which the sqander of the available signal energy is avoided. Let the noise be Gaussian, with the power spectral density given by $N(f)$, with $H(f)$ being the associated complex transfer function of the channel. Then, in order to make efficient use of the available signaling power S, the optimal channel input power is given by:

$$S = \int_{f \in \Omega} B - \frac{N(f)}{|H(f)|^2} df \qquad (17)$$

where the region of integration $\Omega$ is defined by:

$$\Omega = \left\{ f : \frac{N(f)}{|H(f)|^2} \leq B \right\} \qquad (18)$$

Equations (17) and (18) describe the elastic relationship that exists between the power spectral densities of the input signal and the noise during the process of optimizing the available channel bandwidth. In equations (17) and (18) B is an average input power constraint.

From a practical standpoint, the optimal allocation of signaling power is best achieved by channel segmentation. Then, the allocation of bits to the various sub channels is achieved through the process of maximizing the channel capacity while minimizing the baud error rate. There exist in the literature a variety of optimal loading algorithms through which the required energy distribution may be accomplished. A good example may be found in patents: "Ensemble Modem Structure For Imperfect Transmission Media" U.S. Pat. Nos. 4,679,227, 4,732,826 and 4,833,706.

Figure 5:
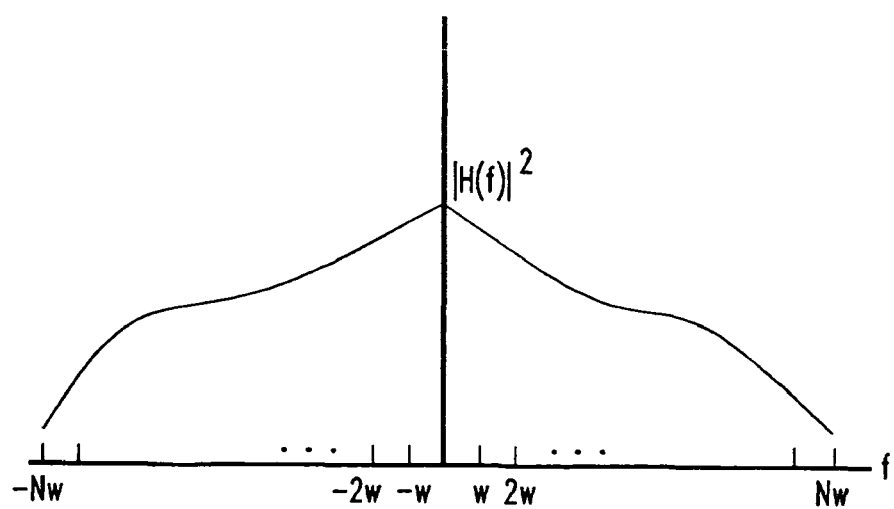
FIG. 5 is a graph depicting channel segmentation and use of the frequency response.

With the aid of FIG. 5, an exemplary approach to optimized loading is now discussed. Let the available channel bandwidth be divided into N equal segments of length W. Assume that the frequency response within the $i^{th}$ segment is flat and given by $H_i(f)$. Let the noise be additive white Gaussian with double-sided spectral density $N_o/2$ watts/Hz. Let the available signal power P be equally divided among all sub channels available, and normalize the system to the first sub channel. The received power in the $i^{th}$ sub channel is thus $P_i=l_iP/N$ where $l_i=|H_i(f)|^2/|H_1(f)|^2$. It can then be shown that a possible optimal choice of bit loading $n_i$ is given by:

$$n_i = \log_2\left\{\frac{(l_i/N)(3/2)(P/N_oW)}{-\ln Pr(\varepsilon)}\right\} \quad (19)$$

Where $n_i$ is the number of bits allocated to the $i^{th}$ sub channel, and $Pr(\varepsilon)$ is the probability of symbol error for all sub channels. In equation (19), since $l_iP/N_oW$ is the signal to noise ratio in the $i^{th}$ sub channel, a preferred embodiment of the invention will use a measured value of the noise in the $i^{th}$ sub channel for the computation of $n_i$. This combined approach to the allocation of signaling energy and of bits to each sub channel comprises a specific optimal approach to water filling.

Figure 2:
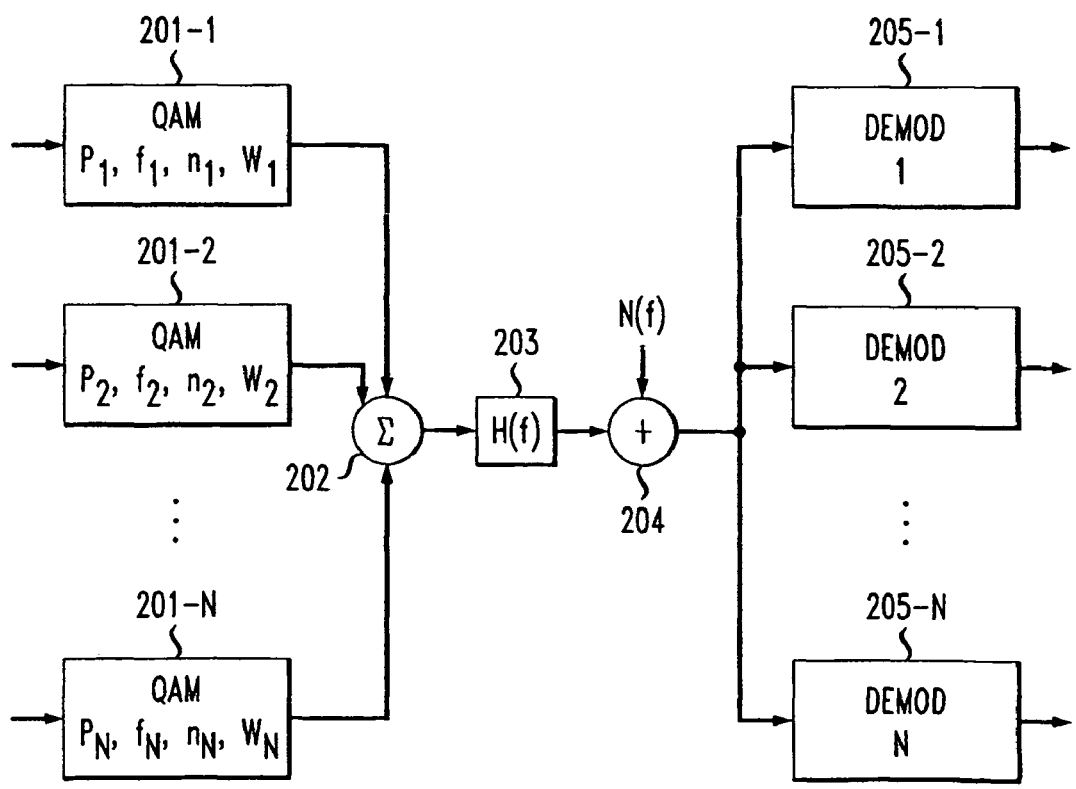
FIG. 2 is a block schematic illustrating an optimized modem using the invention.

A block diagram of the complete transmitter/receiver pair is shown in FIG. 2. In FIG. 2 the transmitter comprises N sub-transmitters 201-1 to 201-N and the summer 202. Input data for transmission through the channel are modulated at each sub-transmitter 201-1 to 201-N, and the outputs are summed at the summer 202 for transmission through the channel characterized by the function block 203. Addition of noise into the system is depicted by function block 204 in FIG. 2. The $i^{th}$ sub-transmitter 201-i is optimized in accord with water filling as described above for the $i^{th}$ segment of the channel. Similarly, the receiver is comprised of N subcomponents 205-1 to 205-N, the $i^{th}$ subcomponent 205-i corresponding the component 201-i of the transmitter.

Figure 3:
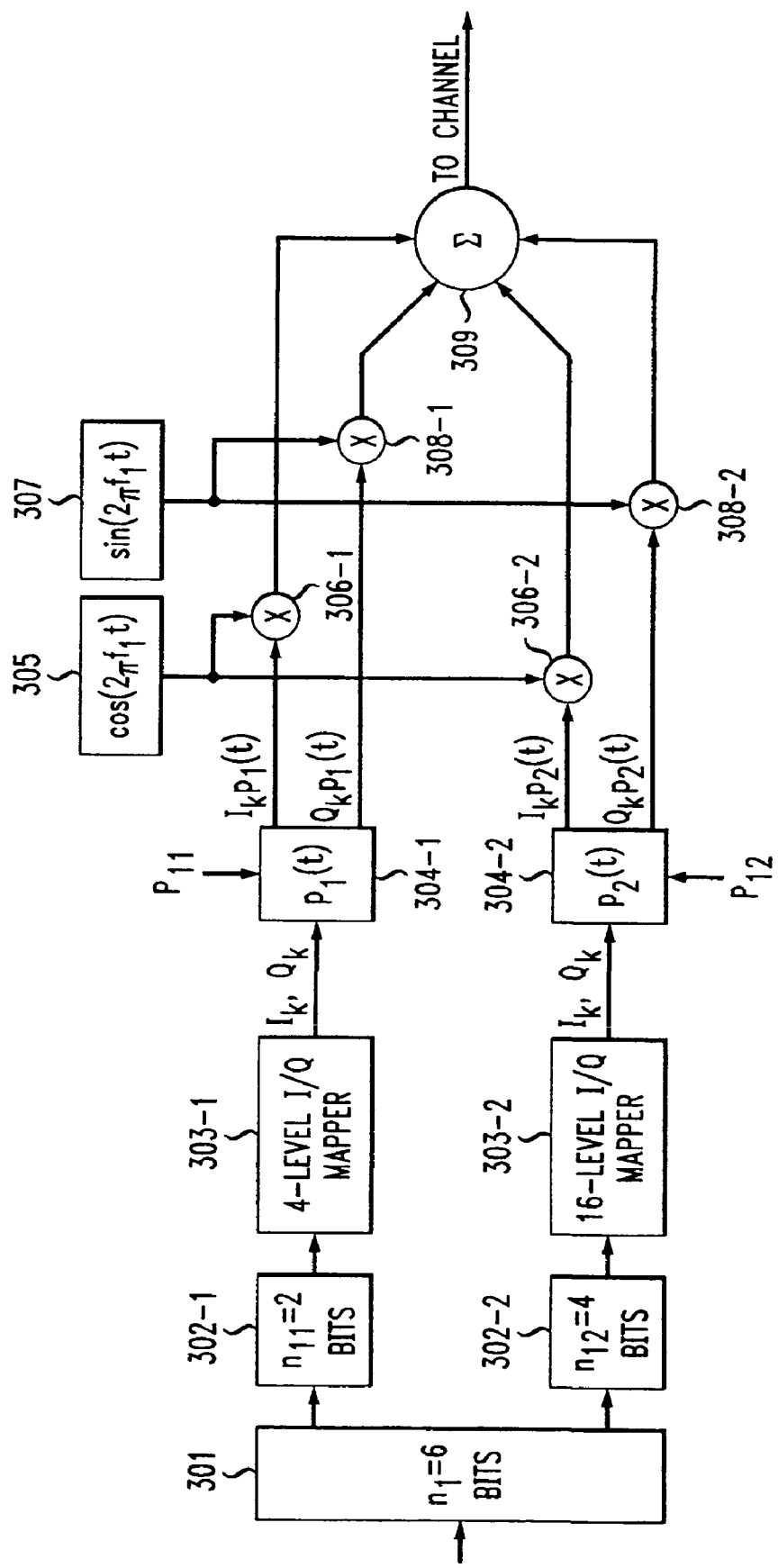
FIG. 3 is a block schematic of a Single Segment Discrete Prolate Transmitter.

The invention is now further described with greater specificity with the use of FIG. 3, which illustrates how the discrete prolate functions are used for capacity optimization. With reference to function block 201-1, assume that, with the use of equation (19), a computed value of 6 was obtained for $n_1$. It is clear from the foregoing discussion that this loading bound can be assured through the resolution of the transmitted signal with the use of two discrete prolate functions. Let $n_1=n_{11}+n_{12}$ with $n_{11}=2$ and $n_{12}=4$. It can further be shown that, given the specific choices for $n_{11}$ and $n_{12}$, if it is assumed that the symbol error is equal in both signaling dimensions, the power must be divided such that $P_1=P_{11}+P_{12}$, where $P_{11}=P_1/3$ and $P_{12}=2P_{11}$. Given the foregoing choices of parameters, an exemplary embodiment of the invention in function block 201-1 is illustrated in FIG. 3. As can be seen from the figure, the six bits to be transmitted are segmented at function block 301 into 2- and 4-bits packets that are sent to function blocks 302-1 and 302-2. At function block 303-1, a 4-level I/Q mapper is used, while a 16-level mapper is used at function block 303-2. Within function block 304-1 the I and Q components from function block 303-1 and the power $P_{11}$ are used to generate the in-phase and quadrature components of the prolate pulses corresponding to $p_1(t)$. Further, these components are modulated at function block 306-1 and 308-1, then summed at function block 309 for output to the channel. As can be seen from FIG. 3, similar activities occur for the dimension corresponding to $p_2(t)$).

Figure 6:
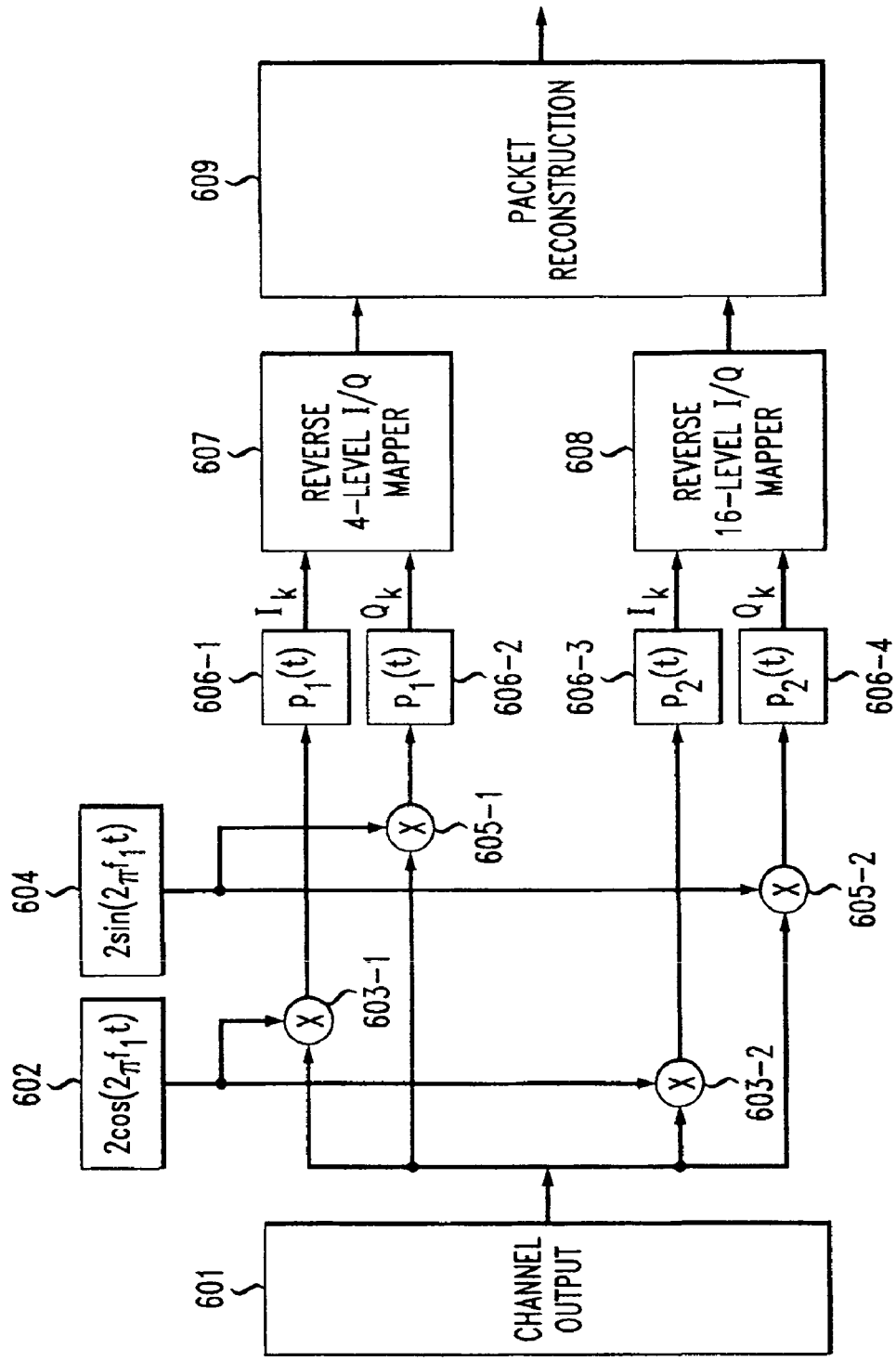
FIG. 6 is a block schematic of the Discrete Prolate demodulator corresponding to FIG. 3.

The structure of the optimized sub-receiver 205-1, associated with sub-transmitter 201-1, is shown in FIG. 6. As discussed earlier, the key to retrieving the bits that were sent in a particular dimension is the use of a low pass eigenfilter for that dimension. The discrete prolate pulses are thus used to form a low pass orthogonal filter bank for extracting the bit information from each dimension. The demodulated $I_k$ and $Q_k$ values finally go through a reverse mapping process, after which the original block of bits is reconstructed.

In the receiver of FIG. 6 the channel output is received as indicated by the block 601. This channel output is connected to a plurality of mixers 603-1, 603-2, 605-1 and 605-2 and are mixed with cosine and sine signals, respectively. These mixed signals are demodulated in the orthogonal filter bank containing filters 606-1, 606-2, 606-3 and 606-4. I/Q reverse mappings are performed in reverse mappers 607 and 608 to recover the segmented bits and the originally transmitted bit pattern is reconstructed in block 609. While discrete blocks are illustrated, the processes are stored program processes that are performed independently of block identification.

Synchronousness being of critical significance to the design of telecommunication systems, reference is now made to the fact that in the construction of FIG. 2, FIG. 3, and FIG. 6, this requirement is stipulated. Thus, in a complete embodiment of the present invention, methods of carrier tracking and symbol recovery shall be implemented. There are various procedures well documented in the literature to accomplish these operations. One reference describing synchronism with respect to carrier tracking and symbol recovery is the text "Digital Communications, Fundamentals and Applications" by Bernard Sklar. Information specifically related to synchronization may be found in chapter 8, Pages 429-474.

Recall that in equation (2) $\epsilon$ was used to determine the pulse efficiency. Thus, in a preferred embodiment equation (9) may be used to shorten the length of the filtering process, in an effort to seek implementation efficiency. Filtering must then be normalized by a factor of $1/\lambda_i$ for each finger. In this case, keeping jitter to a minimum will be a critical issue.

In present-day communication systems, because of the inefficiencies that occur with the application of a single signal for information bearing, the implementation of complex equalization structures is imperative to achieve the most efficient use of the channel. With the implementation of the design discussed herein, the equalizer shall effectively be reduced to a simple scaling function.

The invention presented herein was described in light of a preferred embodiment. It should be understood that such preferred embodiment does not limit the application of the present invention. Persons skilled in the art will undoubtedly be able to anticipate alternatives that are deemed to fall within the scope and spirit of the present application.

What is claimed is:

1. A method for receiving a multi-dimensional high-speed signal comprised of a plurality of bits, via a modem, comprising steps of:
   receiving a channel output having a plurality of bits where each bit is sent in a particular dimension;
   mixing signals of the received channel output with trigonometric signals; and
   retrieving bits in each of the particular dimensions by:
      demodulating the mixed signals in an orthogonal filter bank of low pass Eigen filters defined by a transmitted prolate pulse of the channel output;
      reverse mapping the demodulated mixed signals to recover segmented bits; and reconstructing an originally transmitted bit pattern to recreate an original signal.

2. The method of claim 1, wherein at least one of said mixed signals comprise $I_k$, and $Q_k$ values, wherein the step of demodulating demodulates at least one of said mixed signals and wherein the step of reverse mapping reverse maps the demodulated mixed signals in parallel paths to reconstruct an original transmitted block of bits at a termination of the parallel paths.

3. A high-speed receiver for receiving a multi-dimensional high-speed signal comprised of a plurality of bits, via a modem, comprising:
   an input for receiving a channel output signal having a spectral distribution defined by a prolate pulse;
   a mixing circuitry, connected to said input, to apply trigonometric mixing signals to the channel output signal;
   a demodulation circuitry, connected to said mixing circuitry, including a plurality of orthogonal filter banks of low pass eigen filters defined by a transmitted prolate pulse of the channel output; and
   a reverse mapping circuitry connected to said demodulation circuitry for reconstructing an originally transmitted bit pattern to recreate an original signal.

4. A method of high-speed communications for achieving high spectral efficiency comprising steps of:
   dividing a transmission channel into a plurality of sub channels;
   modulating signals in each sub channel in a numbered plurality of sub transmitters using discrete prolate functions for capacity optimization;
   summing the modulated signals and transmitting the summed signals through a transmission channel subject to noise;
   recovering the individual channels in a plurality of receivers corresponding to the plurality of sub channels; and
   reconstructing original bits of the transmission channel by at least one demodulation technique.

5. The method of claim 4, wherein the step of reconstructing the original bits includes filtering in low pass Eigen filters.

6. The method of claim 5, further comprising the step of:
   reverse mapping one or more demodulated signals from said at least one demodulation technique to recover segmented bits of an originally transmitted bit pattern of a high-speed input signal.

* * * * *